United States Patent
Brielle et al.

(10) Patent No.: US 11,906,013 B2
(45) Date of Patent: Feb. 20, 2024

(54) DEVICE FOR ABSORBING KINETIC ENERGY OF A VEHICLE OR ANY OTHER MOVING BODY

(71) Applicant: CURTISS-WRIGHT ARRESTING SYSTEMS SAS, Merpins (FR)

(72) Inventors: Armand Brielle, Villars en Pons (FR); Paul Ryan, Fleac (FR); Régis Lambert, Cognac (FR)

(73) Assignee: CURTISS-WRIGHT ARRESTING SYSTEMS SAS, Merpins (FR)

( * ) Notice: Subject to any disclaimer, the term of this patent is extended or adjusted under 35 U.S.C. 154(b) by 210 days.

(21) Appl. No.: 16/965,453

(22) PCT Filed: Jan. 23, 2019

(86) PCT No.: PCT/EP2019/051643
§ 371 (c)(1),
(2) Date: Jul. 28, 2020

(87) PCT Pub. No.: WO2019/145366
PCT Pub. Date: Aug. 1, 2019

(65) Prior Publication Data
US 2020/0355236 A1 Nov. 12, 2020

(30) Foreign Application Priority Data
Jan. 29, 2018 (FR) .................................... 1850679

(51) Int. Cl.
*F16F 7/00* (2006.01)
*E01F 13/12* (2006.01)
*F16F 7/12* (2006.01)

(52) U.S. Cl.
CPC .............. *F16F 7/006* (2013.01); *E01F 13/12* (2013.01); *F16F 7/00* (2013.01); *F16F 7/128* (2013.01); *F16F 2236/06* (2013.01)

(58) Field of Classification Search
CPC .... F16F 7/006; F16F 7/00; F16F 7/128; F16F 2236/06
See application file for complete search history.

(56) References Cited

U.S. PATENT DOCUMENTS

| 5,113,981 A | * | 5/1992 | Lantz | F16F 7/006 267/74 |
| 2002/0085880 A1 | * | 7/2002 | Schneider | E01F 15/146 404/6 |
| 2013/0209168 A1 | | 8/2013 | Withers et al. | |

FOREIGN PATENT DOCUMENTS

| CA | 2522893 C | * | 1/2013 | .............. F42B 39/30 |
| FR | 2316483 A1 | | 1/1977 | |

(Continued)

OTHER PUBLICATIONS

International Search Report dated Apr. 2, 2019, issued in corresponding International Application No. PCT/EP2019/051643, filed Jan. 23, 2019, 5 pages.

(Continued)

Primary Examiner — Melody M Burch
(74) Attorney, Agent, or Firm — Christensen O'Connor Johnson Kindness PLLC

(57) ABSTRACT

A device for absorbing kinetic energy of a vehicle or any other moving body includes at least one bundle of straps formed by at least one strap having at least one first strand and at least one second strand secured by a connection means capable of being progressively destroyed by a tensile force intended to be applied on the first strand of the strap. The device also includes at least one anchoring means suitable for connecting the kinetic energy absorption device to a structure on which is intended to be installed. The anchoring means is arranged downstream of the bundle of (Continued)

straps with respect to a deployment direction of the strap under the tensile force intended to be applied on the first strand of the strap.

8 Claims, 9 Drawing Sheets

(56) References Cited

FOREIGN PATENT DOCUMENTS

| FR | 2734544 | A1 | * | 11/1996 | ............. | A45C 13/26 |
| GB | 1313153 | | * | 4/1973 | | |
| GB | 2136915 | A | * | 9/1984 | ............. | A62B 35/04 |
| WO | 89/10302 | A1 | | 11/1989 | | |

OTHER PUBLICATIONS

Written Opinion dated Apr. 2, 2019, issued in corresponding International Application No. PCT/EP2019/051643, filed Jan. 23, 2019, 5 pages.

* cited by examiner

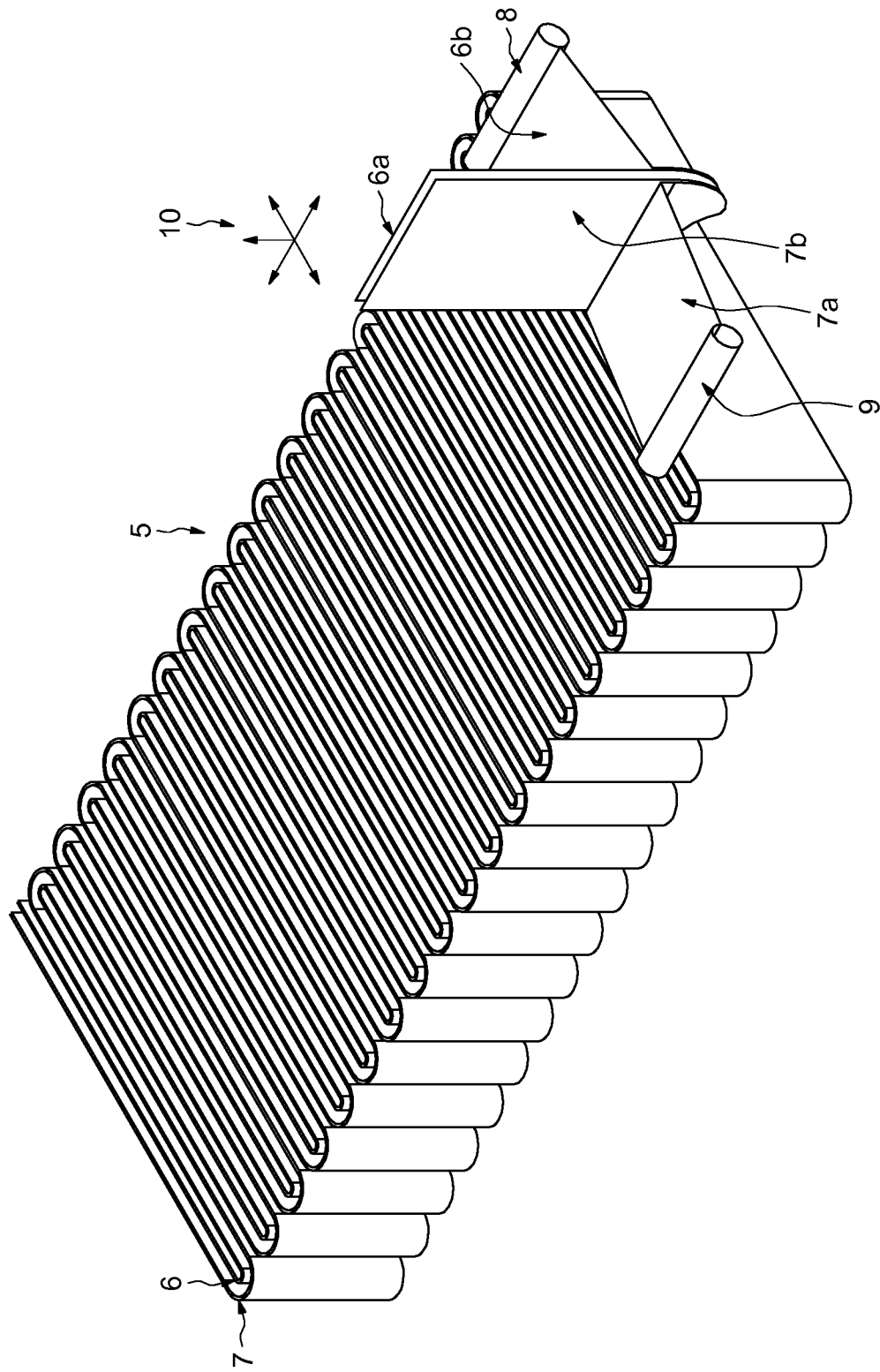

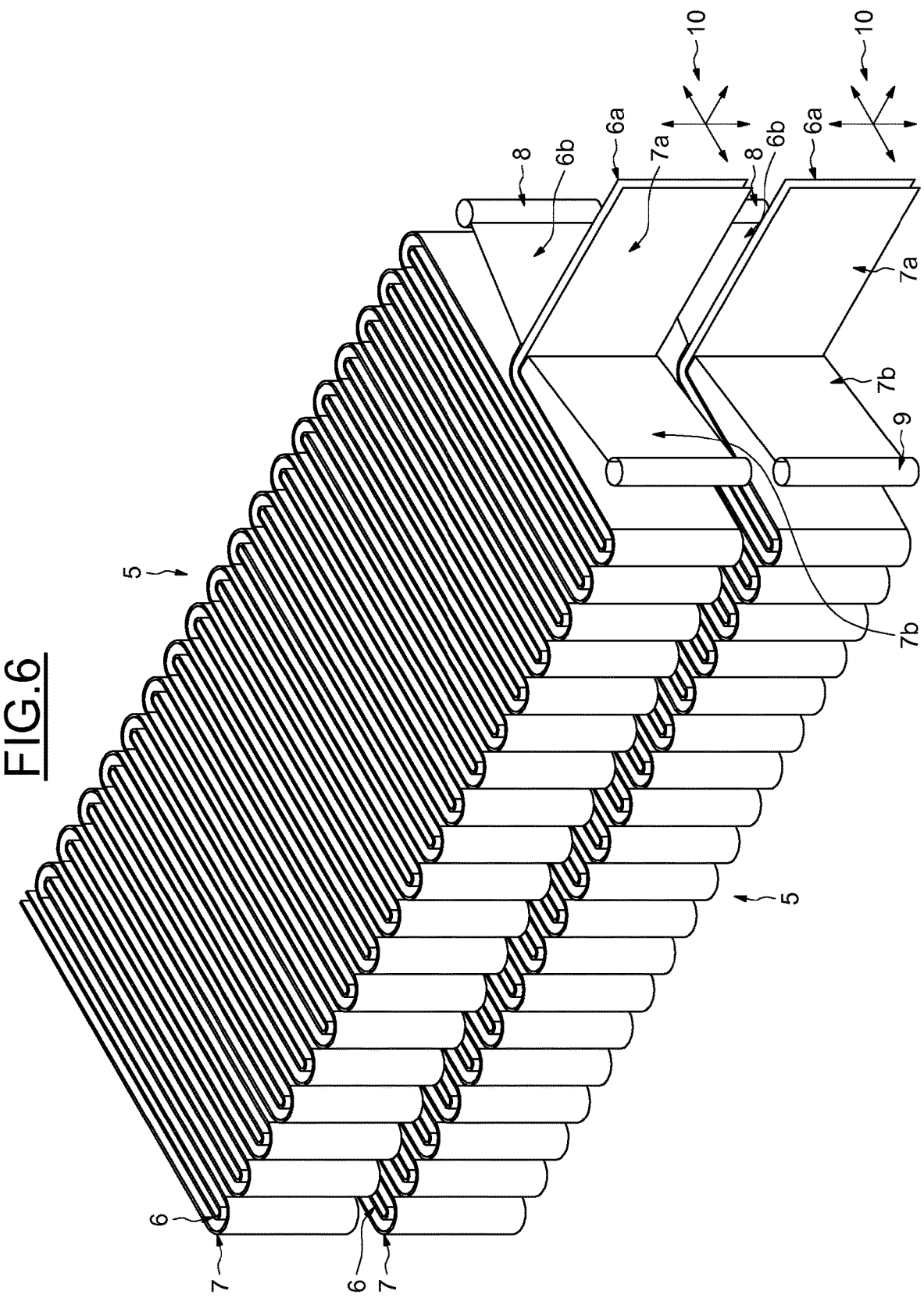

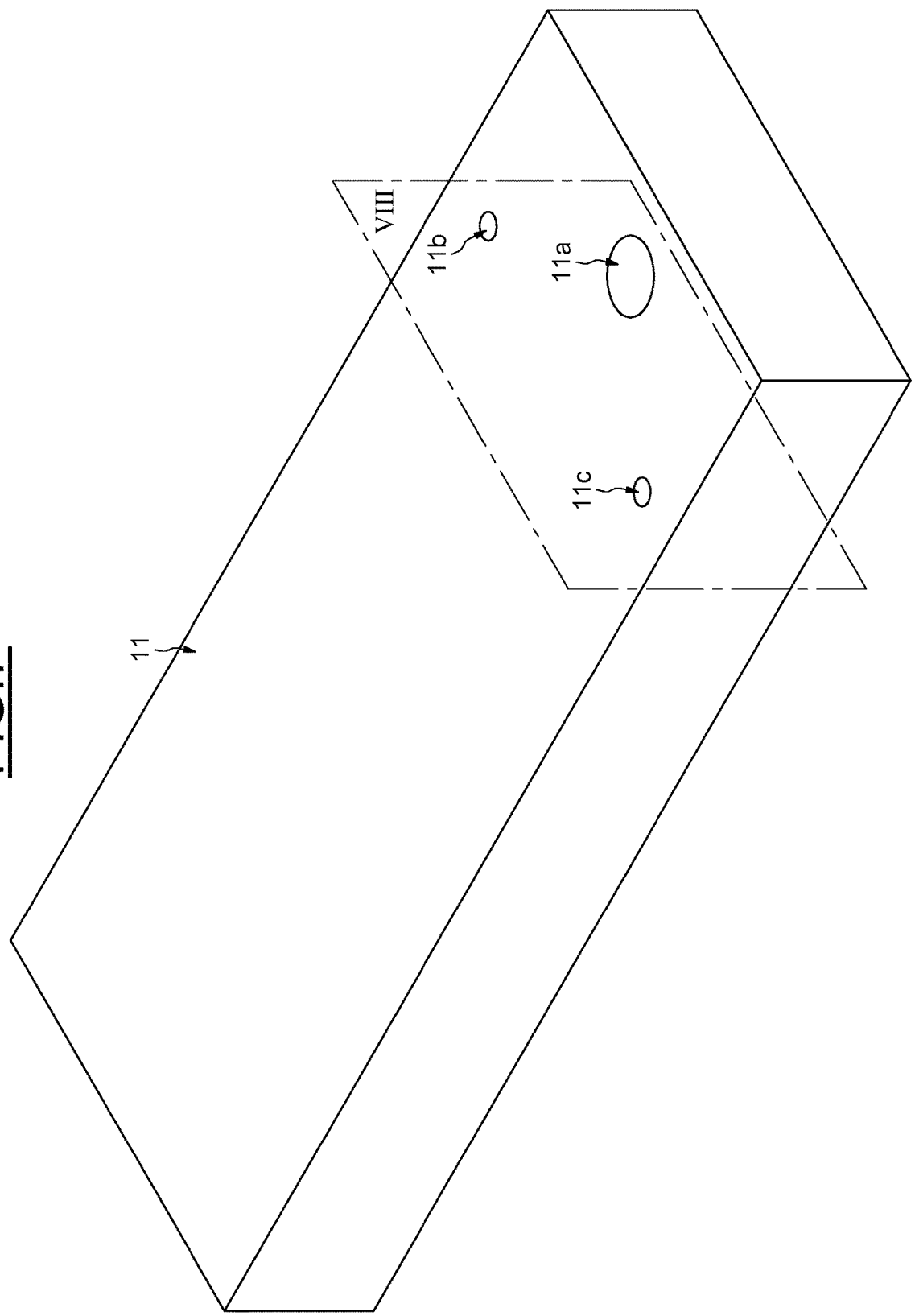

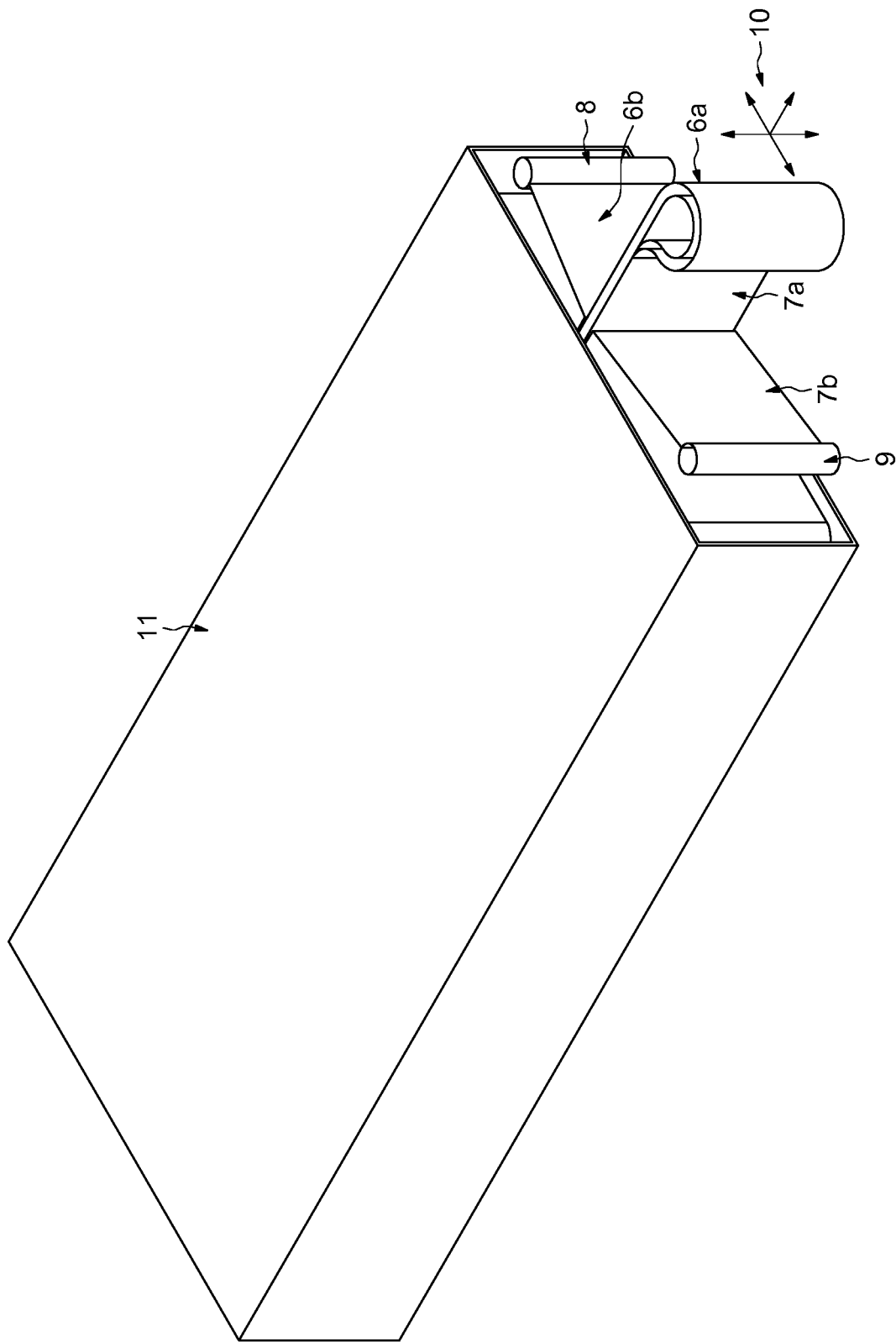

DEVICE FOR ABSORBING KINETIC ENERGY OF A VEHICLE OR ANY OTHER MOVING BODY

The present invention relates, as a whole, to a device for absorbing kinetic energy of a vehicle or any other moving body, and more specifically, a brake intended to brake a vehicle or any other moving body.

More particularly, the present invention relates to a brake formed by a plurality of straps, in particular bundles of stowed straps distributed in a series of identical modules and arranged on either side of the trajectory of the vehicle to be braked. Such a brake is also referred to as a "textile brake". The number of modules and the length of the straps vary as a function of the energy intended to be absorbed.

For a textile brake, each strap comprises two strands capable of being separated. The strands are secured by a connection means capable of being progressively destroyed by a tensile force applied by the vehicle or any other moving body that engages the brake.

According to the field of application concerned, the straps, or the bundles of straps can be associated with a cable and/or with a net.

For example, military aircraft can be equipped with a hook advantageously allowing them to seize a cable arranged on a landing runway to initiate braking. The tensile force applied by the hook on the cable is transmitted to the straps or the bundles of straps, which are thus quickly deployed. The means for connecting the two strands of the straps is progressively destroyed, thus allowing the energy of the moving aircraft to be absorbed.

Alternatively, in the case of aircraft or other types of vehicle that are not equipped with a hook, a net is arranged in the trajectory thereof, allowing the aircraft or the vehicle to be received to initiate braking. The tensile force applied by the net is transmitted to the straps or the bundles of straps, which are thus quickly deployed. The means for connecting the two strands of the straps is progressively destroyed, thus allowing the energy of the moving aircraft or vehicle to be absorbed.

Alternatively, in the case of other applications, the textile brake can be used in order to arrest any type of moving masses such as a falling object or moving body.

According to various embodiments, textile brakes can be permanently installed, for example on concrete foundations, as is the case for certain landing runways for military aircraft, or in a temporary manner, in particular on means of transport on which the textile brakes are installed.

Moreover, an anchoring means connects the brake to a structure on which it is intended to be installed.

A textile brake according to the prior art comprises bundles of straps respectively connected to an anchoring means.

Existing textile brakes are such that, when a vehicle and/or other moving body to be braked engages the brake, the bundles of straps are highly stressed and move suddenly under the effect of a tensile force resulting from the stress exerted by the vehicle. This results in the sudden setting of the modules in motion generating, in particular owing to their weight, dynamic stresses capable of causing damage to the vehicle. On the other hand, the movement of the modules during engagement requires a large coverage area, all the more so since the modules are large in size. Furthermore, the one or more straps in the container thereof are not protected from external elements such as water, mould, animals and other potential external attacks.

The purpose of the invention is thus to overcome these drawbacks and relates to a device for absorbing kinetic energy allowing the bundle of straps to be progressively stressed and allowing the area for storing the bundle of straps to not be set in motion.

The invention thus proposes a device for absorbing kinetic energy of a vehicle or any other moving body comprising at least one bundle of straps formed by at least one strap comprising at least one first strand and at least one second strand secured by a connection means capable of being progressively destroyed by a tensile force intended to be applied on the first strand of the strap, and at least one anchoring means suitable for connecting the kinetic energy absorption device to a structure on which it is intended to be installed.

In addition, the anchoring means is arranged downstream of the bundle of straps with respect to a deployment direction of the strap under the tensile force intended to be applied on the first strand of the strap.

Moreover, according to an alternative embodiment, the second strand of the strap is fastened to the anchoring means by one of the ends thereof.

In such a configuration, the area for storing the bundles of straps remains unmoving during the engagement of a moving body on the device for absorbing kinetic energy.

Preferably, the bundle of straps comprises at least one first strap and at least one second strap.

Advantageously, the anchoring means comprises a first anchor point and a second anchor point, the first strand of the first strap being connected to the first anchor point, the first strand of the second strap being connected to the second anchor point.

According to one feature, the means for connecting the first and second strands can be a so-called "tearing" connection means.

In particular, it can be two strands woven and/or assembled together, the destruction of the assembly means whereof, for example of the weaving, resulting in the strap tearing.

Advantageously, at least one strap of each bundle of straps is stowed in a so-called "boustrophedon" arrangement.

This arrangement optimises the deployment of the straps of each bundle of straps.

According to one embodiment, the device for absorbing kinetic energy can comprise a plurality of bundles of straps.

Advantageously, at least one part of the plurality of bundles of straps can be arranged in series and/or in parallel and/or be superimposed.

The superimposition of the bundles of straps and the arrangement thereof in series and in parallel allows the space dedicated to the installation of the device for absorbing kinetic energy to be optimised.

In this manner, in particular in a series configuration, the bundles of straps located the furthest from the vehicle or from any other moving body could be re-used if not deployed.

Moreover, the area for storing the one or more bundles of straps remains unmoving, and thus the bundles of straps can be superimposed.

Preferably, the bundle of straps is arranged in a conditioning chamber that is at least partially rigid and/or flexible.

The conditioning chamber protects the bundles of straps from the various climatic conditions and from rodents, in particular if the device for absorbing kinetic energy is intended to be installed on an airbase. The stability of the mechanical performance levels of the device for absorbing kinetic energy is thus maintained and the life thereof is extended.

In particular, the rigid conditioning chamber can be reused for a subsequent use of the device for absorbing kinetic energy.

Advantageously, the atmosphere within the conditioning chamber can be a modified atmosphere or a vacuum.

Thus, this allows the life of the device for absorbing kinetic energy to be further extended, and in particular that of the bundles of straps.

It goes without saying that the different features, alternatives and/or embodiments of the present invention can be combined with one another in various combinations insofar as they are not incompatible with one another or exclusive with regard to one another.

The present invention will be better understood and other features and advantages will appear upon reading the following detailed description comprising embodiments provided for illustrative purposes with reference to the accompanying figures, presented as non-limiting examples, which can be used to fully understand the present invention and the description of the embodiment thereof and, where appropriate, to contribute to the definition thereof, from which:

FIG. 5 is a perspective view of a brake before engagement of a vehicle, comprising an anchoring means according to a fourth embodiment;

FIG. 6 shows a brake before engagement of a vehicle, comprising two superimposed bundles of straps;

FIG. 7 shows a brake before engagement of a vehicle, comprising a conditioning chamber;

FIG. 8 shows the brake illustrated in FIG. 7, wherein the front part of the conditioning chamber as far as the cutting plane VIII is not shown;

It should be noted that the structural and/or functional elements in the figures that are common to the different embodiments can bear the same reference numerals. Thus, unless specified otherwise, such elements have identical structural, dimensional and material properties.

FIGS. 1A and 1B show a textile brake according to the prior art, respectively before and after the engagement of a vehicle.

Figure 1A:
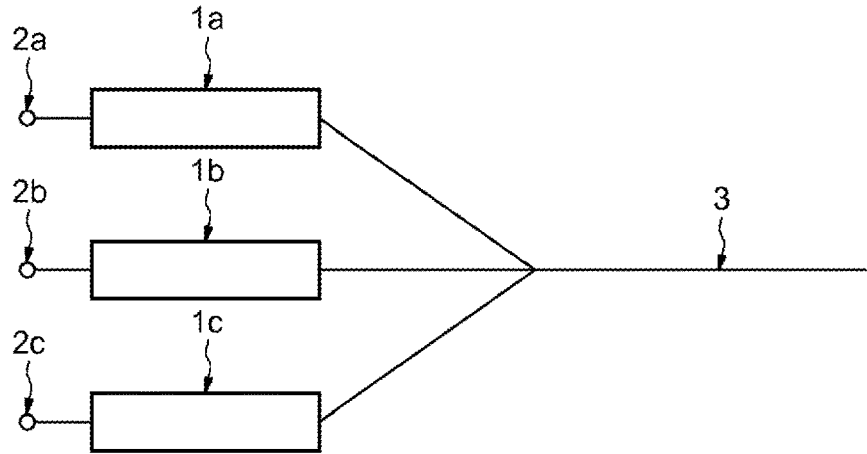
FIGS. 1A and 1B show a brake according to the prior art, respectively before and after the engagement of a vehicle.

According to the example embodiment shown, the brake comprises three bundles of straps, illustrated by modules given the reference numerals 1a, 1b and 1c. Each bundle of straps is respectively connected to an anchoring means 2a, 2b and 2c. Moreover, all of the bundles of straps 1a, 1b and 1c are connected to a common element 3, which can be associated with a cable or with a net.

Before the engagement of the vehicle, the anchoring means 2a, 2b and 2c are arranged upstream of the bundles of straps 1a, 1b and 1c relative to the direction of deployment of the straps under the effect of a tensile force applied by a vehicle acting on the modules via the common element 3 that can be associated with a cable or with a net.

Figure 1B:
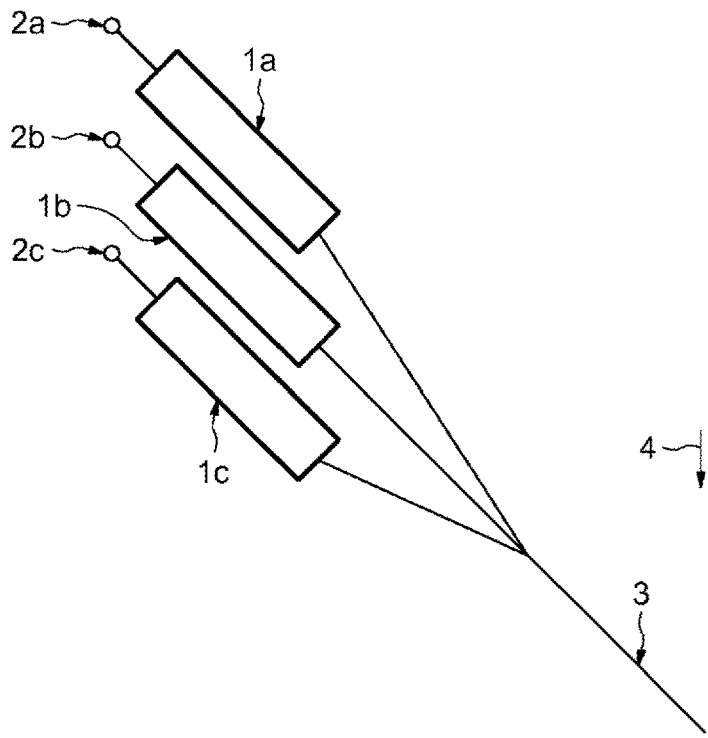

The anchoring means 2a, 2b and 2c according to the prior art are configured such that, when a vehicle moving along a trajectory 4 engages the brake, an area for storing the bundles of straps is highly stressed and undergoes a sudden movement under a tensile force applied by the vehicle on the net or the cable, as shown in FIG. 1B.

Figure 9A:
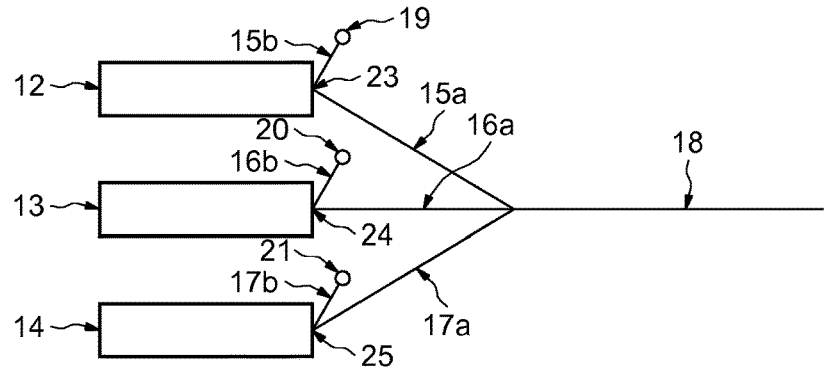
FIG. 9A shows a brake before engagement of a vehicle, comprising three bundles of straps.
Figure 9B:
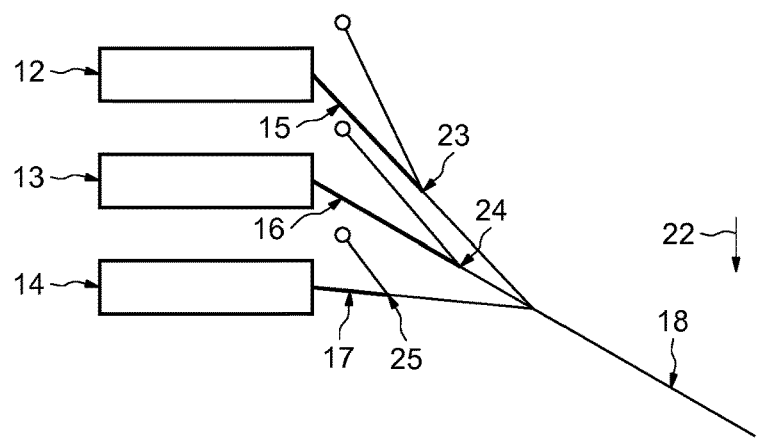
FIGS. 9B and 9C show the brake in FIG. 9A after the engagement of a vehicle.
Figure 9C:
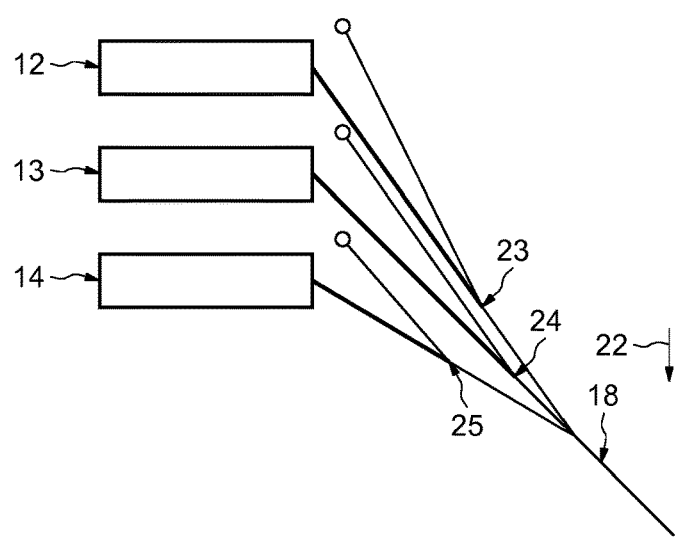

FIGS. 2 to 8 show a device for absorbing kinetic energy of a vehicle or any other moving body, in particular in the form of a brake, according to the present invention, by way of perspective views and overhead views prior to engagement, and during engagement of a vehicle or moving body for FIG. 9A to 9C, comprising an anchoring means according to various embodiments.

More particularly, the brake comprises a bundle of straps 5 formed by at least one strap 6, in particular a strap 6, also referred to as a first strap 6, in particular made of a textile material. According to a specific example, the bundle of straps 5 is formed by at least one first strap 6 and one second strap 7. In the examples shown in FIGS. 2 to 8, the first strap 6, respectively the first strap 6 and the second strap 7, of the bundle 5 is/are stowed in a so-called "boustrophedon" arrangement, i.e. the strap is composed of sections arranged alternately, when the strap is viewed from above, advantageously in an even manner, from left to right then, conversely, from right to left, connected together by elbows. Such an arrangement thus has a configuration similar to a pseudo-sine wave.

It goes without saying that the bundles of straps could be arranged alternately from left to right, then from right to left, beginning and ending indifferently on the left or on the right. The straps can also be arranged in a so-called "boustrophedon" configuration alternatively from top to bottom and from bottom to top.

The first strap 6, respectively the second strap 7, comprises at least one first strand 6a and one second strand 6b, respectively one first strand 7a and one second strand 7b, secured to one another by a connection means capable of being progressively destroyed. Preferably, the first strand 6a and the second strand 6b of the first strap 6, respectively the first strand 7a and the second strand 7b of the second strap 7, are woven and are assembled together to form a so-called "tearing" connection means.

Preferably, the first strand 6a and the second strand 6b of the first strap 6, respectively the first strand 7a and the second strand 7b of the second strap 7, are capable of being separated lengthwise as regards the first strap 6, respectively the second strap 7.

Advantageously, the first strand 6a of the first strap 6, respectively the first strand 7a of the second strap 7, is connected via one of the ends thereof to a cable or to a net or to any other capture element, according to the field of application of the brake, intended to ease the engagement of the vehicle with the braking device and allowing the resulting tensile force applied by the vehicle to be braked to be transmitted to the first strand 6a of the first strap 6, respectively to the first strand 7a of the second strap 7.

Moreover, the brake comprises at least one means for anchoring to a structure on which it is intended to be installed. In the example shown, the anchoring means comprises at least one anchor point 8, in particular at least one first anchor point 8 and one second anchor point 9.

According to an alternative embodiment, the second strand 6b of the first strap 6, respectively the second strand 7b of the second strap 7 is connected, and in a particularly advantageous manner is fastened, to the anchoring means.

In the example shown, the second strand 6b of the first strap 6 is fastened to the first anchor point 8 via one of the ends thereof and the second strand 7b of the second strap 7 is fastened to the second anchor point 9.

Before the engagement of a vehicle or other moving body on the brake, the anchoring means is arranged downstream of the bundle of straps 5 relative to a deployment direction 10 of the first strap 6, respectively of the first strap 6 and of the second strap 7.

The deployment direction 10 corresponds to the direction in which the first strap 6 is deployed, respectively the first strap 6 and the second strap 7 are deployed, when subjected to a tensile force applied by the vehicle or the moving body.

The deployment direction 10 in which the first strap 6 is deployed, respectively the first strap 6 and the second strap 7 are deployed, when subjected to the tensile force applied by the vehicle or the moving body, depends on the trajectory of this vehicle or of this moving body having engaged the brake. More specifically, when the trajectory of the vehicle or of the moving body is modified, the deployment direction 10 is also modified.

The configuration of the brake shown allows the first strap 6, respectively the first strap 6 and the second strap 7, to be able to be deployed in a multitude of deployment directions 10. As a result, the deployment of the first strap 6, respectively of the first strap 6 and the second strap 7, can take place in a multitude of deployment directions 10, and thus of axes depending of the trajectory of the vehicle or of the body to be braked. However, the area for storing the bundle of straps remains unmoving.

When a vehicle engages the braking device, i.e. either, for example, by seizing a cable, or by being received in a net, the first strap 6, respectively the second strap 7, is deployed. The deployment is initiated by the tensile force applied by the vehicle on the first strand 6a of the first strap 6, respectively the first strand 7a of the second strap 7, in particular connected by way of a common element such as a strap, to the cable and/or to the net.

The first strap 6, respectively the second strap 7, arranged upstream of the anchoring means before the engagement of the vehicle or of the moving body is thus deployed downstream of the anchoring means.

According to various embodiments of the present invention, the anchoring means can be arranged facing any one of the faces of the bundle of straps 5.

Figure 2:
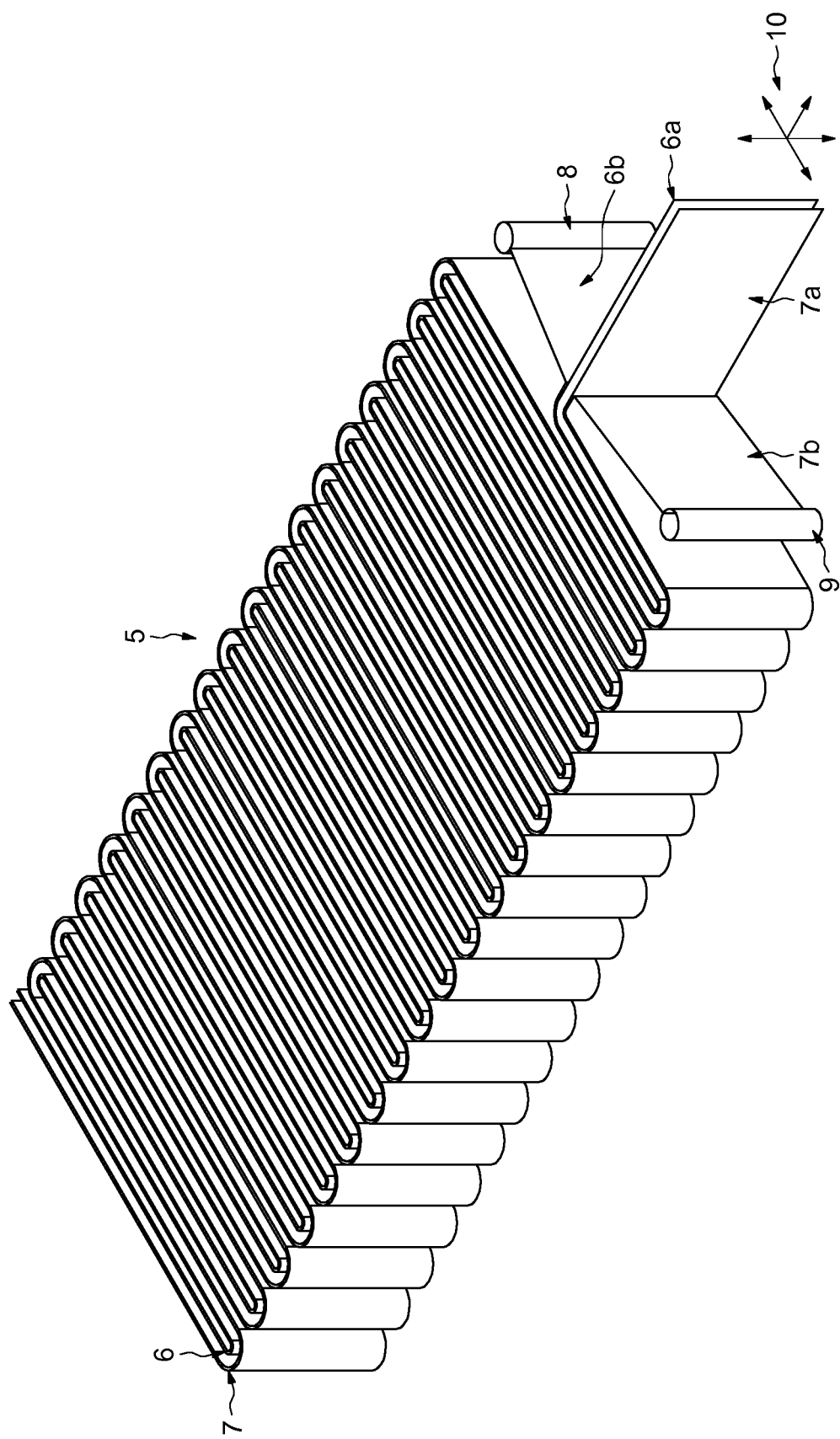
FIG. 2 is a perspective view of a brake before engagement of a vehicle, comprising an anchoring means according to a first embodiment.

For the purposes of illustration, FIGS. 2 and 5 show perspective views of the brake comprising the anchoring means according to a first embodiment and a fourth embodiment, wherein the anchoring means is arranged on a front face of the bundle of straps 5.

Figure 3:
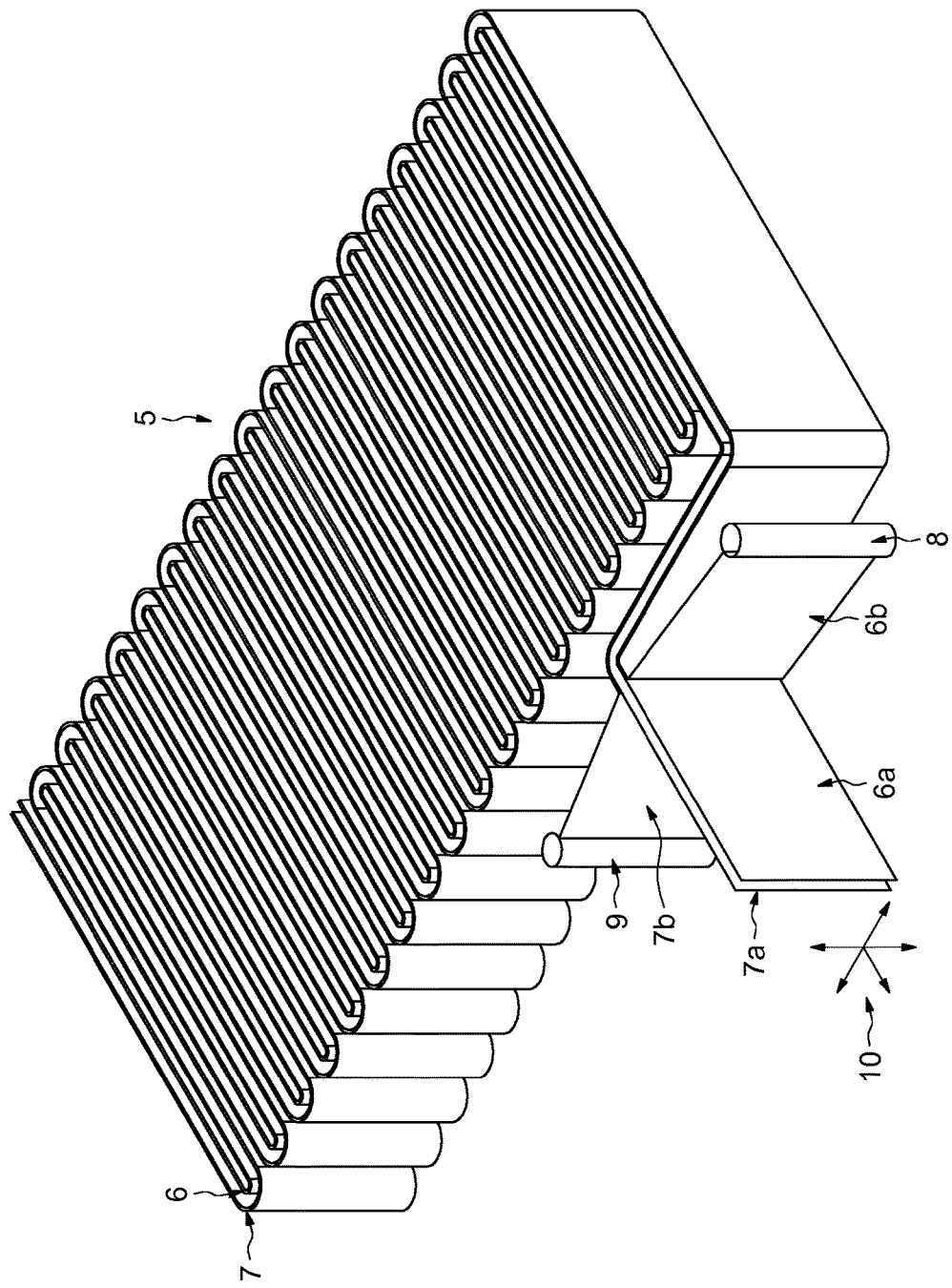
FIG. 3 is a perspective view of a brake before engagement of a vehicle, comprising an anchoring means according to a second embodiment.
Figure 4:
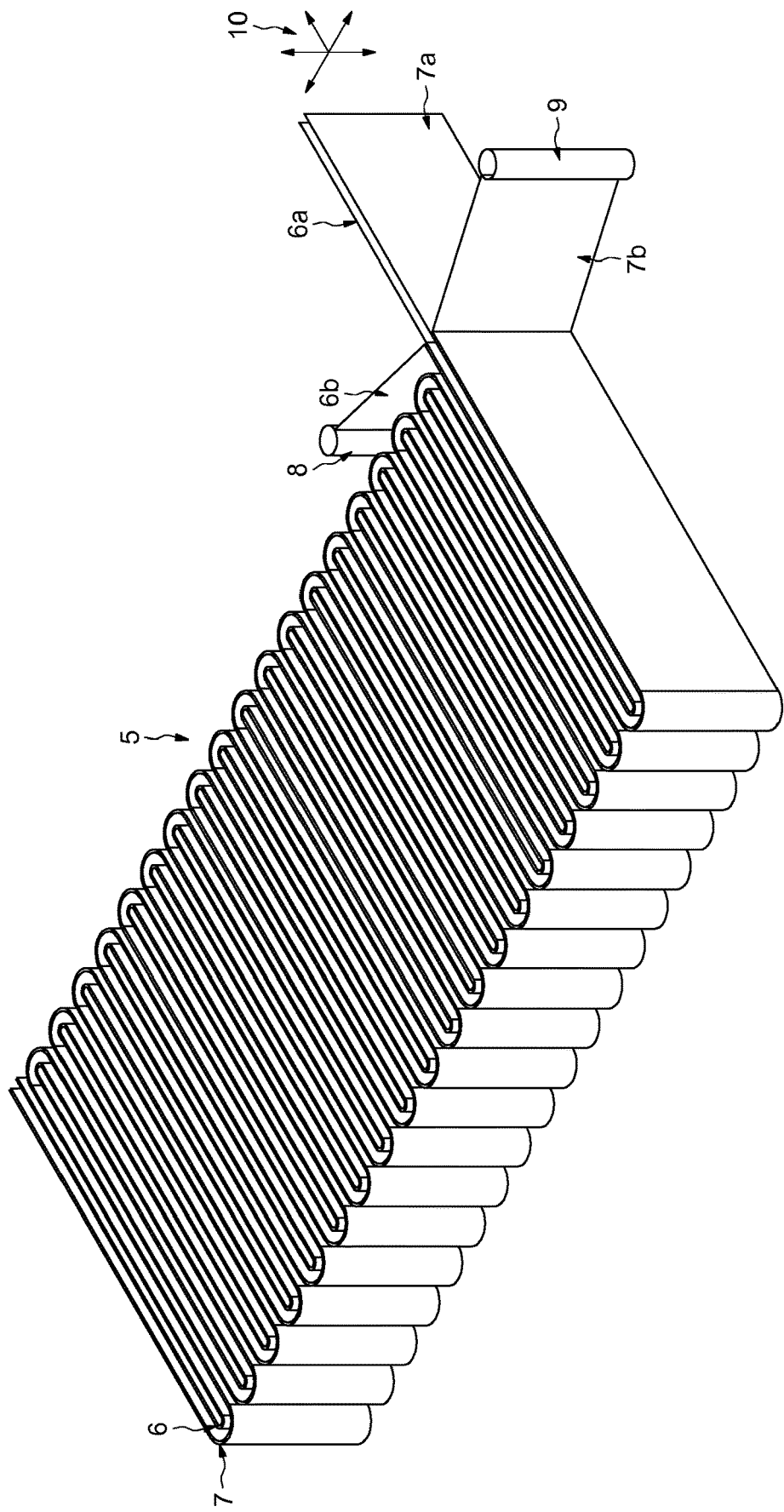
FIG. 4 is a perspective view of a brake before engagement of a vehicle, comprising an anchoring means according to a third embodiment.

FIGS. 3 and 4 show perspective views of the brake comprising the anchoring means according to a second embodiment and a third embodiment, wherein the anchoring means is arranged in front of one of the side faces of the bundle of straps 5.

The arrangement of the anchoring means can thus be adapted as a function of the structure on which the brake is installed.

In an additional example shown in FIG. 6, the brake advantageously comprises at least two superimposed bundles of straps 5.

According to alternative embodiments, a brake can also be provided such that it comprises a plurality of bundles of straps 5, wherein a part of the plurality of bundles of straps 5 is arranged in series and/or in parallel.

It goes without saying that the brake can also be provided such that it comprises a plurality of bundles of straps 5, advantageously, each arranged within a conditioning chamber.

Finally, the length of the straps, the number of bundles of straps and the number of straps per bundle can be adapted as a function of the energy that must be absorbed to brake the vehicle or any other moving body.

In the embodiments shown, the anchoring means comprises one or two anchor points. However, the anchoring means can be provided such that it comprises a higher number of anchor points.

Moreover, FIG. 7 shows a brake comprising a conditioning chamber 11 inside which the bundle of straps 5 is arranged. The conditioning chamber 11 constitutes an area for storing the bundle of straps 5 thus delimited by the conditioning chamber 11. Preferably, the conditioning chamber 11 is water-tight and/or air-tight. The conditioning chamber 11 can be flexible, for example a cover, or rigid, for example a case. Furthermore, the atmosphere inside the conditioning chamber 11 can be placed in a vacuum or modified. The atmosphere of the conditioning chamber 11 can also comprise a moisture removal means.

Preferably, the end of the first strand 6a of the first strap 6, respectively the end of the first strand 6a of the first strap 6 and of the first strand 7a of the second strap 7, is/are folded to form a loop, as shown in FIG. 8, on which the front part of the conditioning chamber as far as the cutting plane VIII, is intentionally not shown.

Moreover, the conditioning chamber 11 advantageously comprises an opening 11a, shown in FIG. 7, passing through the conditioning chamber 11 from end to end. The opening 11a allows the loop of the first strand 6a of the first strap 6, respectively the first strand 6a of the first strap 6 and the first strand 7a of the second strap 7, to be connected to a cable and/or a net.

Furthermore, the conditioning chamber 11 advantageously comprises one opening 11a per anchor point such that the anchoring means can pass through the conditioning chamber 11 so as to install the brake on the structure on which it is to be installed.

In the example shown, the conditioning chamber 11 comprises a first opening 11b, respectively a first opening 11b and a second opening 11c, for passing the anchor point 8, respectively the anchor point 8 and the anchor point 9.

FIG. 9A shows the brake according to the present invention before engagement of a vehicle, comprising three bundles of straps. FIGS. 9B and 9C show the brake according to the present invention during the engagement of a vehicle.

In the embodiment shown in FIGS. 9A, 9B and 9C, the brake comprises three conditioning chambers 12, 13 and 14, in particular arranged in parallel. According to an alternative embodiment, each conditioning chamber 12, 13 and 14 encloses a single strap 15, 16, 17 as described hereinabove. Alternatively, as mentioned hereinabove, the conditioning chambers 12, 13 and 14 can each enclose a plurality of straps.

According to the example embodiment, the first strands 15a, 16a and 17a of each respective strap 15, 16, 17 are advantageously joined to one another at a point connected to a common strap 18, itself connected to a cable or a net.

Furthermore, each second strand 15b, 16b and 17b of each respective strap 15, 16, 17 is fastened to a single respective anchor point 19, 20 and 21.

As can be seen in FIGS. 9B and 9C, after engagement of the vehicle in a movement trajectory 22 with the brake, the first strand 15*a*, 16*a* and 17*a* and the second strand 15*b*, 16*b* and 17*b* of each strap 15, 16, 17 become separated by tearing at a tearing point which progressively moves in a movement trajectory 22 resulting from the tensile force exerted by the vehicle on the brake.

In the example shown, the energy of the vehicle or of the moving body is absorbed by the tearing of the strands of the straps. As a result of the arrangement according to the present invention, the areas for storing the straps are neither stressed, nor set in motion. The straps are progressively deployed and the conditioning chambers 12, 13 and 14 remain unmoving, and in particular remain parallel. They are gradually emptied. The integrity of the conditioning chambers 12, 13 and 14 is guaranteed during the engagement of the vehicle.

The absence of stress on the storage area allow the brake, and in particular the bundles of straps, to be integrated into a pre-existing structure, for example a military building, a ship, an engineering structure, a box or even a buried device.

Advantageously, the brake can be used to arrest or simply to brake any type of vehicle, for example an aircraft (military plane, commercial plan, drone, etc.), a motor vehicle (car, truck, etc.), a train, a metro, a tram, a boat or any other type of moving body such as a falling object or person.

The braking installation can be provided such that it is permanently anchored in place, for example on a ground or integrated into the barriers of a toll booth, or such that it is temporary, for example integrated at least partially into a vehicle or other anchor point.

It goes without saying that the invention is not limited to the embodiments described hereinabove, which are provided by way of example only. It encompasses various modifications, alternative forms and other alternative embodiments that a person skilled in the art could envisage within the scope of this invention and in particular any combinations of the different modes of operation described hereinabove, which can be taken separately or in combination.

The invention claimed is:

1. A device for absorbing kinetic energy of a moving body, comprising:
    a conditioning chamber, wherein the conditioning chamber is rigid;
    at least one bundle of straps arranged in the conditioning chamber in a stowed position and deployable from the conditioning chamber in a deployment direction, the at least one bundle of straps formed by a first strap and a second strap, each first and second straps comprising a first strand and a second strand, the first strand secured to the second stand by a connection capable of being progressively destroyed by a tensile force applied on the at least one first strand of the first and second straps, respectively; and
    a first anchor point and a second anchor point configured to be secured to a structure and to connect to an end of the first strand of the first strap and an end of the first strand of the second strap, respectively, the first anchor point and the second anchor point arranged downstream of the at least one bundle of straps with respect to the deployment direction of the first strap and the second strap under the tensile force so that the conditioning chamber is not stressed or remains unmoved during deployment of the first strap and the second strap.

2. The device according to claim 1, wherein the connection is a tearing connection.

3. The device according to claim 1, wherein the first strap and the second strap are each stowed in a boustrophedon arrangement.

4. The device according to claim 1, comprising a plurality of bundles of straps that includes the at least one bundle of straps.

5. The device according to claim 4, wherein at least one part of the plurality of bundles of straps is at least one of arranged in series, arranged in parallel, or superimposed.

6. The device according to claim 1, wherein an atmosphere within the conditioning chamber is a vacuum.

7. The device according to claim 3, further comprising a plurality of bundles of straps that includes the at least one bundle of straps.

8. The device according to claim 1, wherein the moving body is a vehicle.

\* \* \* \* \*